United States Patent
Logan et al.

(10) Patent No.: US 6,214,095 B1
(45) Date of Patent: Apr. 10, 2001

(54) ADSORBENT POUCH FOR REMOVAL OF GASEOUS CONTAMINANTS

(75) Inventors: Randy Jon Logan, St. Paul; Son T. Nguyen, Eagan; Daniel L. Tuma, St. Paul; David J. Tuffley, Bloomington, all of MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 09/347,378

(22) Filed: Jul. 6, 1999

(51) Int. Cl.[7] ................................................. B01D 53/04
(52) U.S. Cl. ............................... 96/147; 96/154; 55/385.6
(58) Field of Search ........................... 96/134–139, 153, 96/147, 154; 55/514–516, 524, 385.1, 385.6

(56) References Cited

U.S. PATENT DOCUMENTS

| | | |
|---|---|---|
| 1,420,411 | 6/1922 | Currie . |
| 1,784,067 | 12/1930 | Holtson . |
| 2,471,376 * | 5/1949 | Peters ........................................ 96/136 |
| 2,578,324 * | 12/1951 | Southwick, Jr. ........................ 96/153 |
| 2,671,526 | 3/1954 | Hunt et al. . |
| 3,505,783 | 4/1970 | Graham .................................... 55/33 |
| 3,911,080 * | 10/1975 | Mehl et al. ........................... 96/134 X |
| 3,941,034 | 3/1976 | Helwig et al. ........................ 98/2.11 |
| 3,953,566 | 4/1976 | Gore ...................................... 264/288 |
| 3,962,153 | 6/1976 | Gore .................................. 260/2.5 R |
| 4,096,227 | 6/1978 | Gore .................................. 264/210 R |
| 4,177,048 | 12/1979 | Rivers et al. ........................... 55/275 |
| 4,187,390 | 2/1980 | Gore ................................... 174/102 R |
| 4,208,194 | 6/1980 | Nelson .................................... 55/158 |
| 4,274,848 | 6/1981 | La Gro .................................... 55/387 |
| 4,427,425 * | 1/1984 | Briggs et al. ........................ 96/134 X |
| 4,460,392 * | 7/1984 | Poulsen et al. ......................... 96/134 |
| 4,479,818 | 10/1984 | Briggs et al. ......................... 55/385 C |
| 4,514,197 * | 4/1985 | Armbruster ............................. 96/138 |
| 4,517,308 | 5/1985 | Ehlenz et al. ......................... 502/401 |
| 4,614,528 | 9/1986 | Lennen .................................... 55/387 |
| 4,633,349 | 12/1986 | Beck et al. ............................. 360/97 |
| 4,657,570 | 4/1987 | Gronholz et al. ................... 55/385 E |
| 4,668,258 | 5/1987 | Steer ....................................... 55/387 |
| 4,684,510 | 8/1987 | Harkins ................................. 423/210 |
| 4,756,726 | 7/1988 | Peace ...................................... 55/275 |
| 4,830,643 | 5/1989 | Sassa et al. ............................. 55/316 |
| 4,839,014 | 6/1989 | Park et al. ............................ 204/265 |
| 4,863,499 | 9/1989 | Osendorf ................................. 55/316 |
| 4,889,542 | 12/1989 | Hayes ...................................... 55/97 |
| 4,985,296 | 1/1991 | Mortimer, Jr. ....................... 428/220 |
| 5,124,856 * | 6/1992 | Brown et al. ....................... 96/135 X |
| 5,262,375 | 11/1993 | McKedy ................................ 502/406 |
| 5,417,743 * | 5/1995 | Dauber ................................ 96/135 X |
| 5,447,695 * | 9/1995 | Brown et al. ....................... 96/135 X |
| 5,500,038 | 3/1996 | Dauber et al. ......................... 96/135 |
| 5,538,545 | 7/1996 | Dauber et al. ......................... 96/153 |
| 5,593,482 | 1/1997 | Dauber et al. ......................... 96/135 |
| 5,616,169 * | 4/1997 | de Ruiter et al. .................. 96/135 X |
| 5,869,009 * | 2/1999 | Bellefeuille et al. ............... 96/153 X |
| 5,876,487 | 3/1999 | Dahlgren et al. ........................ 96/13 |
| 5,980,616 * | 11/1999 | Johnson et al. ....................... 96/135 |
| 5,997,618 * | 12/1999 | Schneider et al. .................... 96/135 |

FOREIGN PATENT DOCUMENTS

| | | |
|---|---|---|
| 0 225 593 A2 | 6/1987 | (EP) . |
| 2 032 298 | 5/1980 | (GB) . |
| 2161093A * | 1/1986 | (GB) ........................................ 96/134 |
| 2238731A * | 6/1991 | (GB) ........................................ 96/138 |

\* cited by examiner

*Primary Examiner*—Robert H. Spitzer
(74) *Attorney, Agent, or Firm*—Merchant & Gould P.C.

(57) ABSTRACT

An adsorbent pouch assembly for removing gaseous contaminants and impurities from a gas stream. The assembly is particularly designed for non-adhesively mounting into the internal enclosure of a disk drive.

21 Claims, 5 Drawing Sheets

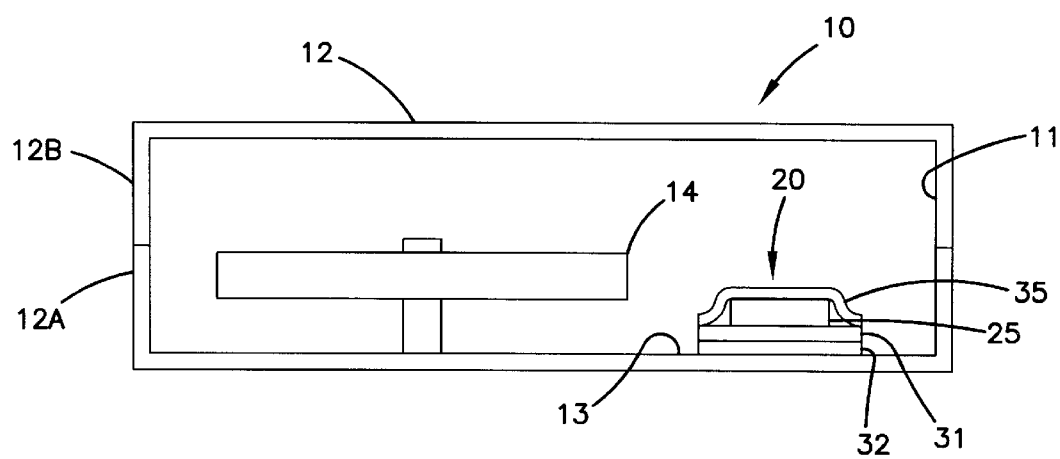
FIG. 1
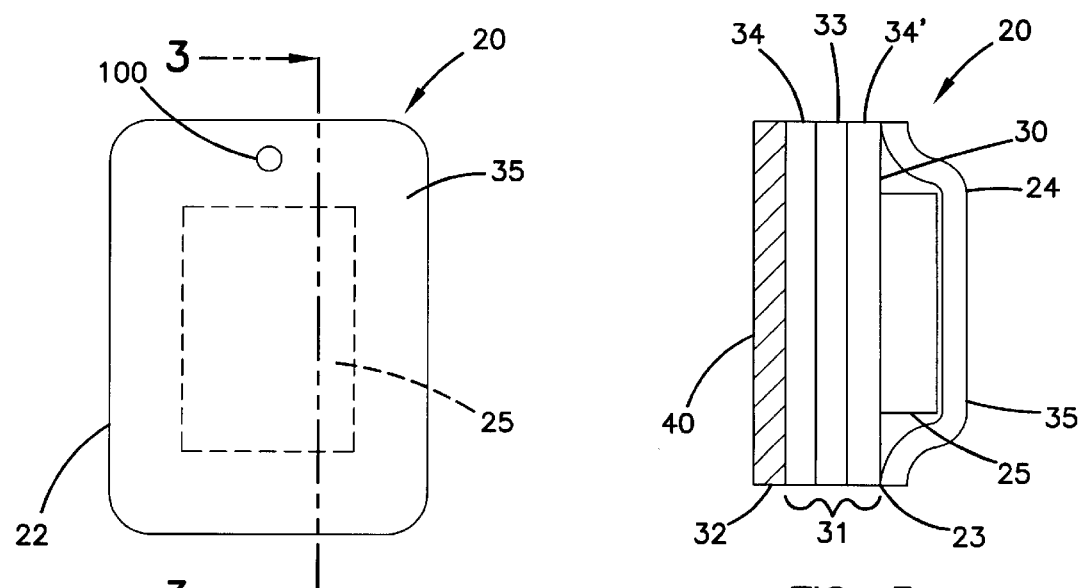
FIG. 2
FIG. 3

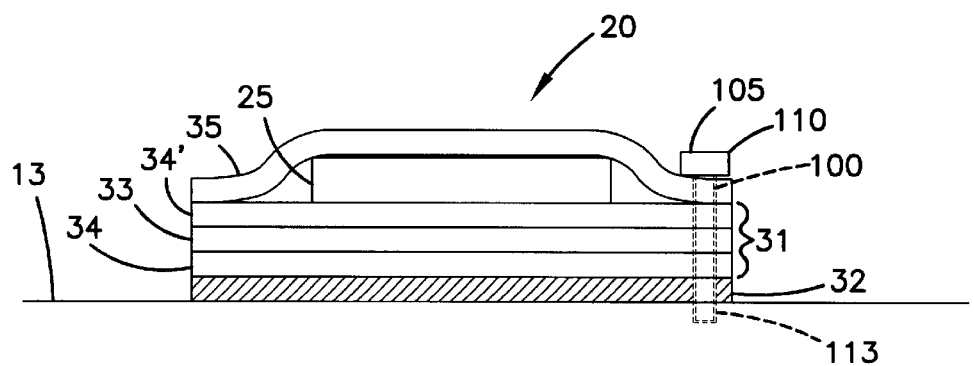
FIG. 4
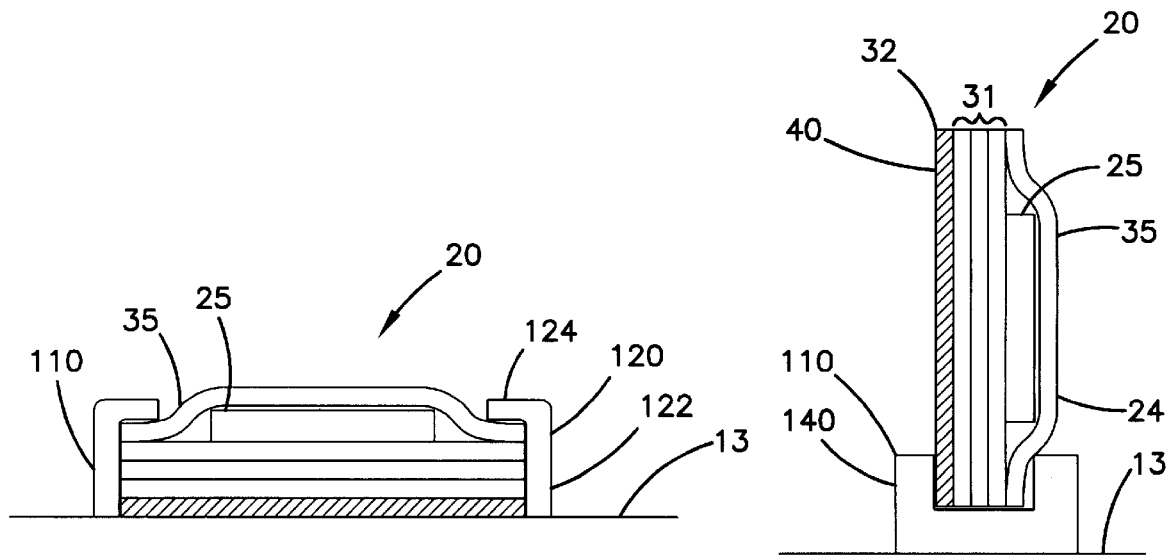
FIG. 6
FIG. 8

ADSORBENT POUCH FOR REMOVAL OF GASEOUS CONTAMINANTS

FIELD OF THE INVENTION

The present invention relates to an adsorbent pouch assembly for removal of gaseous contaminants and impurities from a gas stream. In particular, the invention includes an adsorbent pouch assembly for insertion into the internal enclosure of a disk drive.

BACKGROUND OF THE INVENTION

Adsorbent filters have a variety of uses, including uses in electronic equipment and chemical manufacturing and storage. For example, in the computer industry, adsorbent filters are used within the housings or casings of electronic devices to protect the electronic components from contaminants and impurities, such as water vapor, acid gases, and volatile organic compounds. For example, disk drives often include adsorbent filters within the enclosure of the disk drive and/or over an opening in the disk drive housing to protect the drive components and the disks from contaminants. Without such protection, these contaminants can lead to stiction, corrosion, and, in some instances, drive failure. Inclusion of an adsorbent filter improves the performance of the disk drive and extends its life. Typically, the adsorbent filter includes an adsorbent material, such as activated carbon or a desiccant, within the filter material. Pores within the filter allow contaminants to diffuse through the filter material and be adsorbed by the adsorbent material.

U.S. Pat. No. 5,593,482 discloses a thin compact adsorbent assembly for adhesively mounting in an enclosure such as a computer disk drive. This self-stick adsorbent assembly has a low profile container for selectively adsorbing gaseous components. The assembly comprises one or more layers of adhesive, one of which adheres the assembly to a surface of the disk drive. The assembly also includes one or more layers of adsorbent or reactant material and a layer of filter material.

As aerial densities continue to grow and flying heights between the disk and read head lessen, disk drives are becoming increasingly sensitive to contamination. Adhesively mounting a filter assembly on a surface of a disk drive enclosure may contribute to this contamination. For example, if the adhesively mounted filter assembly is removed or repositioned, the adhesive may leave an adhesive residue on the surface of the disk drive enclosure. If the adhesive is left exposed, the adhesive residue may outgas (or offgas). Outgassing includes the release and/or production of gaseous or other contaminants by the adhesive. Outgassing by the adhesive residue can produce additional contaminants that are introduced into the disk drive environment. Further, the residue may accumulate and retain particulate contaminants and dust. These contaminants, or the adhesive itself, could loosen, flake, or become dislodged, providing debris in the disk drive enclosure. This debris can permanently damage a disk drive. To eliminate or reduce the contaminants caused by the adhesive residue, the adhesive residue may be removed and the surface cleaned. A solvent may be needed to thoroughly clean the surface of adhesive; however, these solvents may also cause contamination that can damage the drive assembly. Gaseous contaminants, similar to those produced by the adhesive residue outgassing, are also produced by solvents used to remove the residue.

In addition to eliminating or reducing contaminants caused by adhesive, eliminating the adhesive residue on the disk drive enclosure also greatly reduces the number of disk drive assemblies that might be thrown away. Disk drive assemblies are often discarded if the filter is mounted incorrectly because it is easier, less expensive, and/or results in less contamination to get a new assembly than to clean the contaminated one.

SUMMARY OF THE INVENTION

The present invention relates to an adsorbent pouch assembly for removal of gaseous contaminants and impurities from a gas stream. The assembly is particularly designed for insertion into the internal enclosure of a disk drive.

In particular, the pouch assembly comprises an adsorbent, a filtering layer, an adhesive layer, and a base layer configured and arranged for non-adhesively mounting in the disk drive. In one embodiment, the adsorbent pouch assembly includes a non-adhesive base layer having a non-adhesive outer surface and an adhesive layer disposed on the base layer opposite the outer surface. A non-adhesive filtering layer is disposed over the base layer and adhesive layer and, together with the adhesive layer, forms a peripheral seal around the edge of the adsorbent pouch assembly. An adsorbent material is disposed between the non-adhesive base layer and the non-adhesive filtering layer and is surrounded by the peripheral seal.

In another embodiment, an adsorbent pouch assembly for removing gaseous contaminants from a disk drive is provided. The pouch assembly includes a base layer having a non-adhesive first surface and a second surface opposing the first surface, wherein the non-adhesive first surface forms a non-adhesive external surface of the adsorbent pouch assembly. Disposed on a portion of the second surface of the base layer is an adhesive layer; typically the adhesive layer extends around the periphery of the base layer. Also disposed on the second surface of the base layer is an adsorbent for adsorbing contaminants from the disk drive housing interior. A non-adhesive filter layer is disposed over the adsorbent and forms, with the adhesive layer positioned on the base layer, a peripheral seal around the adsorbent.

In yet another embodiment, a combination of an adsorbent pouch assembly as described above and a disk drive housing is provided.

BRIEF DESCRIPTION OF THE DRAWINGS

FIG. 1 is a simplified schematic cross-section side view of the interior of a disk drive enclosure including an adsorbent pouch assembly in accordance with the present invention;

FIG. 2 is a perspective top view of an adsorbent pouch assembly in accordance with a first embodiment of the present invention;

FIG. 3 is a cross-sectional view of the adsorbent pouch assembly of FIG. 2 taken along line 3—3;

FIG. 4 is a cross-sectional view of the adsorbent pouch assembly of FIG. 3 mounted within a disk drive enclosure according to one embodiment of the invention;

FIG. 6 is a cross-sectional view of the adsorbent pouch assembly of FIG. 3 mounted within a disk drive enclosure according to another embodiment of the invention;

FIG. 8 is a cross-sectional view of the adsorbent pouch assembly of FIG. 3 mounted within a disk drive enclosure according to a further embodiment of the invention;

DETAILED DESCRIPTION OF THE PREFERRED EMBODIMENT

Figure 5:
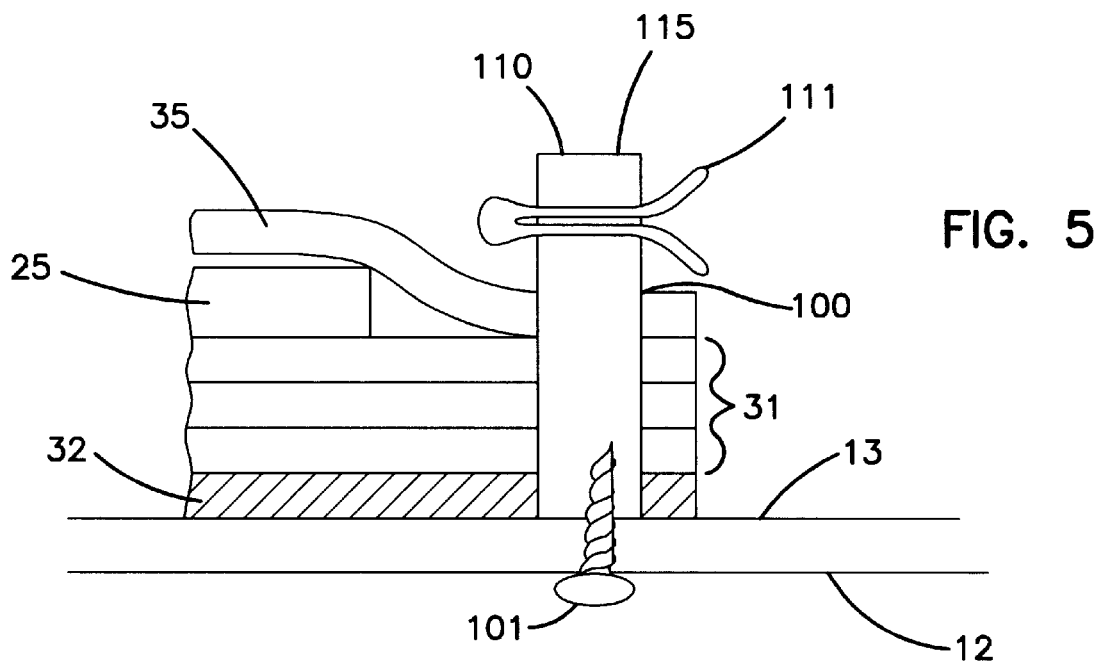
FIG. 5 is an enlarged cross-sectional view of the adsorbent pouch assembly of FIG. 3 mounted within a disk drive enclosure according to a second embodiment of the invention.

The present invention relates to an adsorbent filter assembly for use within the interior housing of a disk drive unit. The adsorbent filter assembly is designed to remove these contaminants from the enclosure atmosphere by either adsorption or absorption. As used throughout this application, the terms "adsorb", "adsorption", "adsorbent" and the like, are intended to also include the mechanism of absorption and adsorption materials. While the present invention is not so limited, an appreciation of various aspects of the invention will be gained through a discussion of the examples provided below. The invention will be described with reference to the Figures, where like numerals are used to represent like elements throughout the Figures.

Referring to FIG. 1, a housing enclosure 12 for a disk drive assembly 10 includes an adsorbent pouch assembly 20 according to the present invention therein. Adsorbent pouch assembly 20 is mounted within enclosure 12 by a non-adhesive mounting system, as will be described below. Also within enclosure 12 are a disk drive 14 and related mechanical systems (not shown) for operation of disk drive assembly 10. Adsorbent pouch assembly 20 is mounted onto an interior surface of enclosure 12, such as, for example, a side surface 11 or a bottom surface 13. FIG. 1 shows adsorbent pouch assembly 20 mounted to bottom surface 13 of enclosure 12. Disk drive assembly 10 and similar disk assemblies in which the adsorbent pouch assembly 20 may be used are found in numerous types of electronic equipment, for example, computers, video cameras, digital cameras, compact disc (CD) players, DVD players, and the like. The adsorbent pouch assembly 20 may potentially be used with other electronic equipment and/or in other applications.

Adsorbent pouch assembly 20 is mounted in enclosure 12 by non-adhesive mounting, such as, mechanical mounting. No adhesives are used to secure assembly 20 within enclosure 12. The use of adhesives can increase the amount of contaminants, both particulate and gaseous, within enclosure 12 and can damage disk drive assembly 10. Adhesives outgas, that is, release gaseous contaminants into the surrounding atmosphere. This outgassing produces additional contaminants which have to be adsorbed by adsorbent pouch assembly 20. Further, adhesives can collect particulate debris on their surface; this debris can become dislodged and then damage disk 14.

The adsorbent pouch assembly 20 can be placed within enclosure 12 during assembly of the disk drive unit 10. In one embodiment, shown in FIG. 1, enclosure 12 comprises a bottom portion 12A and a top portion 12B. During assembly of disk unit 10, top portion 12B of enclosure 12 is removed to allow access to disk 14 and the other mechanisms. Adsorbent pouch assembly 20 can be mounted on bottom surface 13 or any other interior surface, e.g., on a top surface or a side surface 11, while top portion 12B is removed. Unlike adsorbent assemblies that are adhesively mounted to enclosure 12, such as those assemblies taught by U.S. Pat. No. 5,593,482, the adsorbent pouch assembly 20 of the present invention and variations thereof can be easily removed and repositioned without leaving any adhesive residue or other contamination.

Non-Adhesive Mounting

The adsorbent pouch assembly is non-adhesively mounted in the disk drive assembly. In at least some instances, the disk drive assembly includes at least one mounting member to facilitate mounting of the adsorbent pouch assembly. Examples of suitable mounting members 110 are illustrated in FIGS. 4, 5, 6, 7, 8 and 13.

In general, mounting member 110 may be any non-adhesive mechanism that is capable of securing, grasping, gripping, retaining, mounting or otherwise holding adsorbent pouch assembly 20 to any interior surface of the disk drive assembly 10. One example of mounting member 110 is any object that can be passed through hole 100 in adsorbent pouch assembly 20, such as a pin, a post, a screw, a rivet, a bolt, a nail, and the like. Any of these mounting members 110 may be straight or bent. A single mounting member 110 may be used, or multiple mounting members 110 may be used to secure a single adsorbent pouch assembly 20.

Mounting member 110 may be removable from the interior surface on which it is mounted; that is, mounting member 110 may be capable of being repeatedly removed and replaced from a surface. Examples of removable and replaceable mounting members 110 include mounting members 110, such as pin, post, screw, rivet, bolt, nail, and the like, that can be passed through hole 100 in adsorbent pouch assembly 20 and secured on a surface. FIG. 5 shows an embodiment where mounting member 110 is removeably affixed to the interior surface, such as bottom surface 13, by a fastener 101 which may extend through enclosure 12 and the surface to secure mounting member 110 to the interior surface. In FIG. 5, fastener 101 is illustrated as a screw, but may be a pin, nail, or the like. Mounting member 110 itself may extend through enclosure 12 and the surface and be secured, for example, by a bendable end.

Alternately, mounting member 110 may be permanently affixed to an interior surface of enclosure 12. For example, mounting member 110 may be integrally formed with the housing of the disk drive assembly 10, for example, molded, if enclosure 12 and mounting member 110 are thermoplastic or thermoset polymers, or stamped, if enclosure 12 and mounting member 110 are metal, such as sheet metal. Alternatively, mounting member 110 may be integrally formed with a fixture within the disk drive assembly 10, such as a part of the disk drive mechanism. That is, any fixture within disk drive assembly 10 may be designed to function for its intended purpose and, in addition, function as mounting member 110. In yet another embodiment, mounting member 110 may be permanently affixed to an interior surface by any mechanism such as welding, ultrasonic welding, soldering, permanently affixing with a screw, nail, pin, staple, rivet, or the like.

Whether removably or permanently affixed to an interior surface, mounting member 110 may be configured and arranged to accept a securing member 111 (shown in FIG. 5)

to retain adsorbent pouch assembly 20 on mounting member 110. For example, securing member 11, such as a cotter pin or screw, may be passed through mounting member 110 to retain adsorbent pouch assembly 20. Alternately, mounting member 10 may be deformable, that is, be capable of being bent (similar to a cotter pin); an end of mounting member 110 could be bent once adsorbent pouch assembly 20 is mounted so that assembly 20 cannot be removed from mounting member 110. A single mounting member 110 or multiple mounting members 110 may be used to retain adsorbent pouch assembly 20 on interior surface 11.

Referring again to FIG. 4, adsorbent pouch assembly 20 is mounted on bottom surface 13 using a type of mounting member 110. Mounting member 110 is illustrated in FIG. 4 as a pin 105 passed through hole 100 (also shown in FIG. 2) in adsorbent pouch assembly 20. Pin 105 passes through hole 100 and then seats within member acceptor 113 in bottom surface 13. In FIG. 4, pin 105 is designed to be held within member acceptor 113 by frictional forces, however mounting member 110 may be permanently or removably held in place by any mechanism such as welding, ultrasonic welding, soldering, a screw, nail, pin, staple, rivet, and the like.

Alternately, rather that passing mounting member 110 through hole 100, as illustrated in FIG. 4, pouch assembly 20 can be positioned so that hole 100 is brought down and around mounting member 110, such as post 115 in FIG. 5.

Instead of passing mounting member 110 through or over and around hole 100, mounting member 10 may secure adsorbent pouch assembly 20 to an interior surface by providing a retaining element against a surface of adsorbent pouch assembly 20 which holds assembly 20 against the interior surface. A mounting member 110, such as pin 105, post, clamp, rail, etc. may be positioned adjacent adsorbent pouch assembly 20 with a portion of mounting member 110 extending over and securing and/or retaining adsorbent pouch assembly 20. A single mounting member 110 or multiple mounting members 110 may be used. In FIG. 6, adsorbent pouch assembly 20 is mounted onto an interior surface, in particular bottom surface 13, by mounting members 110, in particular, rails 120. Adsorbent pouch assembly 20 is slid between and retained by rails 120. Wall 122 of rail 120 extends adjacent to adsorbent pouch assembly 20 and restricts or prevents lateral movement of adsorbent pouch assembly 20. Lip 124 of rail 120 extends over a portion of adsorbent pouch assembly 20 and restricts or prevents vertical movement.

Figure 7:
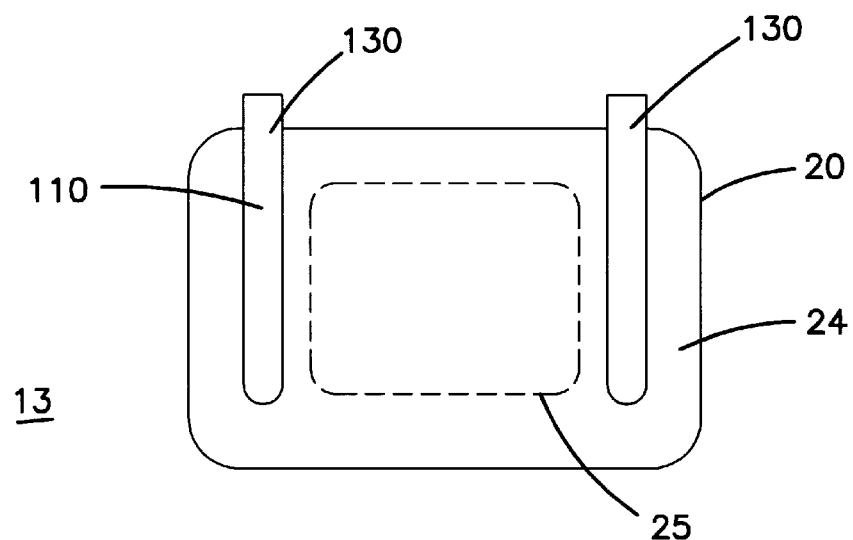
FIG. 7 is a top view of the adsorbent pouch assembly of FIG. 3 mounted within a disk drive enclosure according to yet another embodiment of the invention.

A mounting member 110 may also provide some force for holding adsorbent pouch assembly 20 to the interior surface. Mounting member 110 may be spring loaded or have some elasticity therein. FIG. 7 illustrates another embodiment of a mechanism for mounting adsorbent pouch assembly 20 to an interior surface, in particular, bottom surface 13, with mounting member 110. In FIG. 7, adsorbent pouch assembly 20 is mounted on bottom surface 13 by clamp 130 with upper surface 24 of assembly 20 as the topmost layer. Two clamps 130 are shown in FIG. 7. Clamps 130 provide sufficient force to hold down and retain adsorbent pouch assembly 20 to bottom surface 13. Clamps 130 may also be spring loaded or may have internal elasticity to provide sufficient force to keep adsorbent pouch assembly 20 retained. In FIG. 7, clamps 130 are shown extending parallel to each other across a majority of the width of adsorbent pouch assembly 20; however, clamps 130 may extend across the entire width of assembly 20 or may extend over only a portion of the width. Although clamps 130 are shown in FIG. 7 as parallel and both positioned on the same side of adsorbent pouch assembly 20, clamps 130 could be positioned parallel to each other yet on opposite sides of adsorbent pouch assembly 20 from each other. Yet further, clamps 130 could be positioned on adjacent sides of adsorbent pouch assembly 20 so that clamps 130 are not parallel, but are, for example, perpendicular to each other.

FIG. 8 shows another embodiment of a method for mounting adsorbent pouch assembly 20 to an interior surface 11 with adsorbent pouch assembly 20 retained non-horizontally to surface 11 on which it is mounted. In FIG. 8, adsorbent pouch assembly 20 is mounted on an interior surface, in particular to bottom surface 13, by mounting member 110, illustrated, for example, as a "C" clip 140. Clip 140 may be designed to retain adsorbent pouch assembly 20 in a position non-horizontal to the surface on which pouch 20 is mounted. As shown in FIG. 8, base layer 32 of assembly 20 may be held perpendicular to bottom surface 13.

Figure 13:
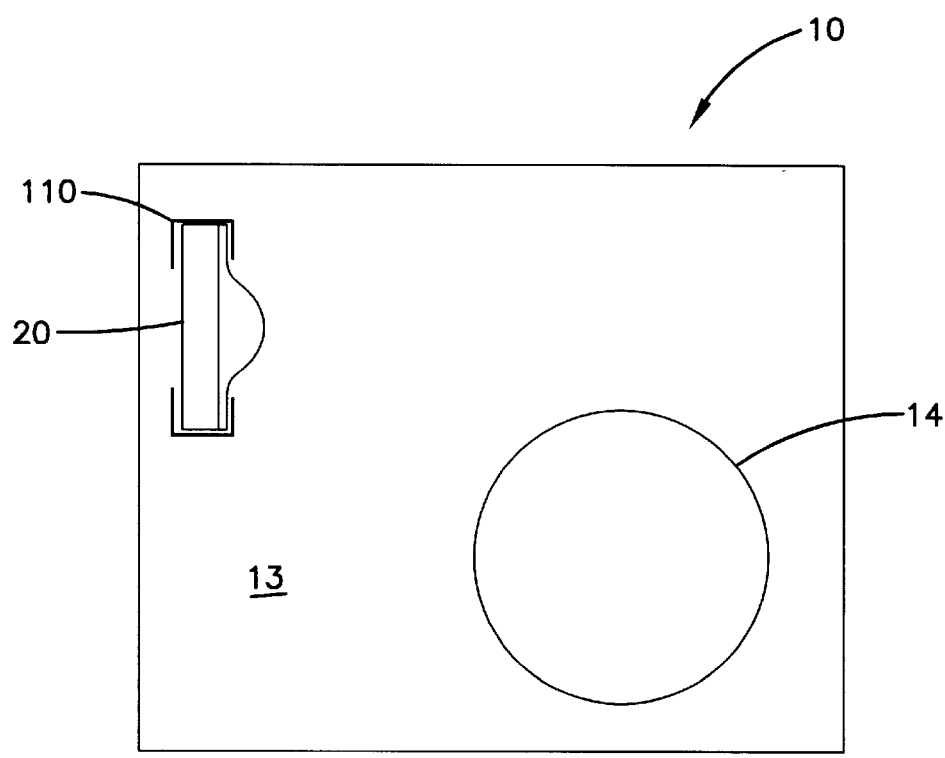
FIG. 13 is a simplified top view of an adsorbent pouch assembly mounted within a disk drive enclosure according to yet another embodiment of the invention.

It may be desired to hold adsorbent pouch assembly 20 non-parallel or non-horizontal to the interior surface on which pouch assembly 20 is mounted. One advantage of this non-horizontal positioning is to allow air to access both outer surface 40 and outer surface 24 of adsorbent pouch assembly 20. By increasing the surface area of adsorbent pouch assembly 20 exposed to air, the performance of the pouch assembly and its ability to remove contaminants from the air, may be increased. This is useful if base layer 32 comprises an air permeable membrane, for example polytetrafluoroethylene. Adsorbent pouch assembly 20 may be mounted so as to be generally perpendicular to the interior surface on which it is mounted, as shown in FIGS. 8 and 13, or assembly 20 may be mounted at any angle that allows access to both outer surface 40 and outer surface 24. This angle may be anything greater than 0 degrees, i.e., horizontal to the interior surface on which it is mounted, up to and including 90 degrees, i.e., perpendicular to the interior surface on which it is mounted.

In some embodiments, adsorbent pouch assembly 20 and the container in which assembly 20 is mounted may be sized so that adsorbent pouch assembly 20 contacts more than one interior surface 11, for example, bottom surface 13 and an opposite top surface. The top surface may press against adsorbent pouch assembly 20, and improve the mounting of assembly 20 on surface 11. For example, adsorbent pouch assembly 20 may be mounted on a bottom surface 13 as shown in FIG. 8, so that one edge of assembly 20 is against bottom 13 and an opposite edge of assembly 20 is against the top of the enclosure.

FIG. 13 illustrates another arrangement having also an adsorbent pouch assembly 20 mounted using mounting members 110 on a bottom surface 13 of a disk drive unit 10, which includes a disk 14. In some embodiments, the adsorbent pouch assembly may be slid into the mounting members 110 and then the top portion of the housing, when the disk drive unit is assembled, may also hold the adsorbent pouch assembly in place. In some instances, this top portion may even include mounting members to facilitate holding the adsorbent pouch assembly in place.

Adsorbent Pouch Assembly

Referring to FIG. 1, adsorbent pouch assembly 20 is used to adsorb or absorb gaseous contaminants, not shown, that may be present in enclosure 12 and which can damage disk drive assembly 10 and in particular disk drive 14. Common gaseous contaminants include, but are not limited to, dioctylphthalate, chlorine, hydrogen sulfide, nitrous oxide, mineral acid gases, silicone vapors, and hydrocarbons. These and other contaminants may be generated from within enclosure 12 or may be from an external source. Usually, enclosure 12 allows air exchange from the interior of enclosure 12 to the ambient atmosphere. Adsorbent pouch assembly 20 is designed to remove these contaminants from the enclosure atmosphere by adsorption and/or absorption, as discussed above.

Referring now to FIG. 2, adsorbent pouch assembly 20 is shown from a top view as it would be seen if mounted onto bottom surface 13 of enclosure 12. Covering adsorbent pouch assembly 20 at the top is a non-adhesive filtering layer 35. Under filtering layer 35 is an adsorbent 25, shown in phantom.

Adsorbent pouch assembly 20 has an outer perimeter 22 (shown in FIG. 2) defining the shape of the assembly 20. Adsorbent pouch assembly 20 is shown as rectangular in FIG. 2, but could be any shape, for example, circular, square, trapezoidal, etc. The shape and size of adsorbent pouch assembly 20 may differ, depending on the application in which adsorbent pouch assembly 20 is used.

Figure 11:
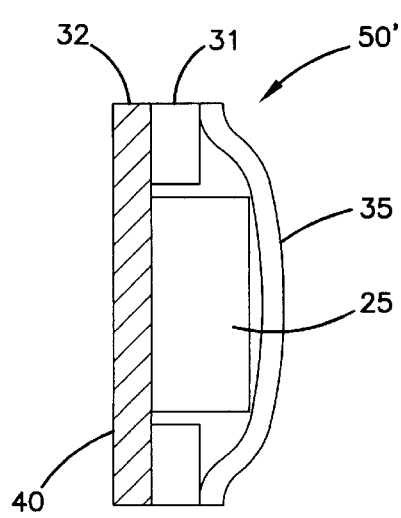
FIG. 11 is a perspective top view of the adsorbent pouch assembly shown in FIG. 10.

Adsorbent pouch assembly 20 may further include optional features, such as a hole 100, shown in FIGS. 2 and 11. Hole 100 can be included for non-adhesively attaching adsorbent pouch assembly 20 to an interior surface, such as side surface 11 (shown in FIG. 1) or bottom surface 13 of enclosure 12 of disk drive assembly 10. Hole 100 can be used to mechanically attach adsorbent pouch assembly 20 to enclosure 12, for example, by passing mounting member 110, such as pin 105 (FIG. 4), through hole 100 and securing to enclosure 12, for example, as shown in FIG. 4. Alternately, adsorbent pouch assembly 20 can be mounted by passing hole 100 over a mounting member 110, such as post 115 (FIG. 5). Preferably, hole 100 passes through an area of adsorbent pouch assembly 20 where filtering layer 35 and base layer 32 are securely attached, so that no air can pass through to adsorbent 25 without passing through filtering layer 35. Hole 100 is not needed for embodiments where adsorbent pouch assembly 20 will be retained within enclosure 12 by a mounting member 110 that does not require a hole 100.

FIG. 3 shows a cross-sectional view of adsorbent pouch assembly 20 taken along line 3—3 in FIG. 2. As can be seen, adsorbent pouch assembly 20 comprises an adsorbent 25 enclosed between a non-adhesive filtering layer 35 and a non-adhesive base layer 32. Base layer 32 has an outer surface 40 which is a non-adhesive surface. Positioned between filtering layer 35 and base layer 32 is an adhesive layer 31. In FIG. 3, adhesive layer 31 is positioned between adsorbent 25 and base layer 32 so that adsorbent 25 is positioned on inner surface 30 of adhesive layer 31. A peripheral seal 23 is formed around adsorbent 25 by fastening filtering layer 35 to base layer 32 via adhesive layer 31.

Base Layer

Base layer 32 has an outer surface 40 which forms an outermost surface of adsorbent pouch assembly 20. Outer surface 40 is the surface that may be disposed adjacent the interior surface, such as bottom surface 13, of enclosure 12. Adsorbent pouch assembly 20 is not intended to be connected to enclosure 12 via adhesive, but by a non-adhesive system, for example, a mechanical system, such as shown in FIGS. 4, 5, 6, 7 and 8.

Base layer 32 is a non-adhesive layer and can be a barrier layer that is substantially impervious to passage of air. Examples of non-porous, or impermeable materials useable for base layer 32 include, but are not limited to, polyester, polyethylene, nylon, polytetrafluoroethylene, metallized polyester, and other polymers. An impermeable base layer 32 may inhabit the penetration of moisture into pouch assembly 20. In some embodiments, base layer 32 may be a molded or extruded thermoplastic piece.

Alternately, base layer 32 can be a porous or permeable membrane which allows air to pass through. A porous or permeable membrane is a membrane that has an air permeability of at least about 0.03 cm/sec (0.05 ft/min) at a pressure drop of about 0.1 cm (0.05 inches) of water. The pores of a porous membrane are typically in the range of about 0.01 to 5 micrometers. In at least some instances, base layer 32 may filter air entering the adsorbent pouch assembly 20 through the base layer 32. However, base layer 32 is typically not so porous as to allow adhesive from adhesive layer 31 to diffuse or leak through layer 32. Examples of porous or permeable materials useable for base layer 32 include, but are not limited to, polyester, nylons, expanded polytetrafluoroethylene, polysulfones, and other polymers.

In some embodiments, base layer 32 is marked or otherwise identified to differentiate it from filtering layer 35. This may aid a user or assembler to correctly place adsorbent pouch assembly 20 in receptacle 12 so that air has access to, and can flow through, at least filtering layer 35. Useful markings include alphanumeric characters, colors, patterns, textures, and the like.

Adhesive Layer

Figure 9:
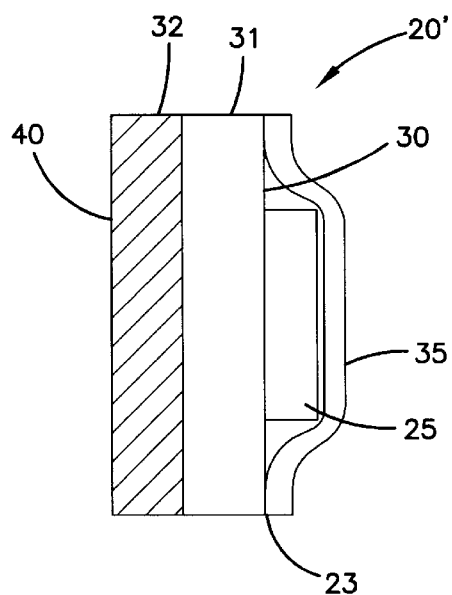
FIG. 9 is a cross-sectional view of a second embodiment of the adsorbent pouch assembly according to the invention.

Disposed on base layer 32 is adhesive layer 31 on the side opposite outer surface 40 of base layer 32. Adhesive layer 31 can be an individual layer of adhesive or can be two or more layers of adhesive disposed on opposing sides of a carrier. In FIG. 3, adhesive layer 31 is shown as three layers, adhesive layer 34, carrier 33, and adhesive layer 34'. In FIG. 9, adhesive layer 31 is shown as a single adhesive layer. If the adhesive is on a film carrier, as in FIG. 3, one example of a usable adhesive layer 31 is a double sided tape with an adhesive coating 34, 34' on each opposite side of a film carrier 33. Alternately, a single sided tape with an additional coating of adhesive on the film carrier opposite the side of the original adhesive coating can be used to make a double sided adhesive layer. Types of useable adhesives 34 include, but are not limited to, epoxies, acrylates and methacrylates, urethanes, acrylics, latex and rubbers. Typical film carriers 33 include polymer film, such as, for example, polyethylene, polypropylene, polyester, polycarbonate, polyurethane, or polyvinyl chloride film.

Double sided tape, such as that made by coating an adhesive, commercially available from 3M under the trade designation 9461P, onto a Mylar® polyester, can be used for the present invention.

Filtering Layer

A non-adhesive filtering layer 35 is disposed over non-adhesive base layer 32 and adhesive layer 31. Outer surface 24 of filtering layer 35 is an outermost surface of adsorbent pouch assembly 20. Together with base layer 32 and adhesive layer 31, filtering layer 35 forms a peripheral seal 23 along the perimeter 22 (shown in FIG. 2) of adsorbent pouch assembly 20. Filtering layer 35 is preferably a permeable membrane that allows air flow through the layer. Filtering layer 35 may be a microporous membrane or other permeable membrane or barrier that allows vapor to permeate through the membrane or barrier. Preferred microporous membrane materials useful in the present invention include, for example, PTFE (i.e., polytetrafluoroethylene) membranes (e.g., GORE-TEX® membranes, available from W. L. Gore and Associates, Inc., Elkton, Md. and TETRATEX® membranes, available from Tetratec, Inc., Feasterville, Pa.), and modified acrylic copolymer membranes. Permeable expanded PTFE membranes are taught, for example, in U.S. Pat. Nos. 3,953,566; 3,962,153; 4,096,227, and 4,187,390.

Again referring to FIG. 3, perimeter seal 23 is located along perimeter 22 (shown in FIG. 2). Perimeter seal 23 is formed by sealing filtering layer 35 to base layer 32, for example, by adhesive layer 31. Alternately or additionally, filtering layer 35 could be sealed to base layer 32 with a mechanical connector such as staples, heat sealing or ultrasonic welding. Perimeter seal 23 is typically sufficiently secure to substantially prevent or eliminate air flow between filtering layer 35 and base layer 32 along perimeter 22. Air flow generally passes through filtering layer 35 in order to gain access to adsorbent 25.

Adsorbent

An adsorbent material 25 is disposed between non-adhesive base layer 32 and non-adhesive filtering layer 35 and is surrounded by peripheral seal 23. Adsorbent 25 typically includes a material selected from physisorbents and/or chemisorbents, such as, for example, desiccants (i.e., materials that adsorb or absorb water or water vapor) and/or materials that adsorb or absorb volatile organic compounds and/or acid gas. As discussed above, adsorbent 25 could also or alternately be an absorbent. Suitable adsorbent materials include, for example, activated carbon, impregnated carbon, activated alumina, molecular sieves, silica gel, and impregnated carbon, alumina, and silica These materials may be combined with and/or impregnated with, for example, potassium permanganate, calcium carbonate, potassium carbonate, sodium carbonate, calcium sulfate, or mixtures thereof.

Adsorbent 25 may adsorb or absorb one or more types of contaminants, including, for example, water, water vapor, acid gas, and volatile organic compounds. Although adsorbent 25 may be a single material, mixtures of materials are also useful. Two different adsorbent materials may be mixed to create a mixture of two materials that form adsorbent 25, or two adsorbent materials may be otherwise combined, for example, silica gel can be blended with carbon particles. In some embodiments, adsorbent 25 may include layers of adsorbent material, so that different contaminants are selectively removed as they pass through the different adsorbent layers.

For typical operations, adsorbent 25 is stable and adsorbs contaminants within normal disk drive operating temperatures, for example, within a range of about 10° C. to 50° C.

The adsorbent material used may be a powder (for example, it passes through 100 mesh) or granular material (28 to 200 mesh). Alternately, adsorbent 25 may be shaped into a unitary form, such as a granule, bead, or tablet that may be further shaped. In at least some instances, the shaped adsorbent article substantially retains its shape during the normal or expected lifetime of the adsorbent pouch assembly 20. The shaped adsorbent article may be formed from a free-flowing particulate material combined with a solid or liquid binder that is then shaped into a non-free-flowing article. The shaped adsorbent article may be formed by, for example, a molding or a compression molding process.

The binder used may be dry, that is, in powdered and/or granular form, or the binder may be a liquid, solvated, or dispersed binder. In some embodiments, a temporary liquid binder, including a solvent or dispersant which may be removed during the molding process, may be used. Typically, a binder that does not completely coat the adsorbent material is used. Suitable binders include, for example, latex, microcrystalline cellulose, polyvinyl alcohol, starch, carboxyl methyl cellulose, polyvinylpyrrolidone, dicalcium phosphate dihydrate, and sodium silicate.

Preferably the composition of a shaped adsorbent article includes at least about 70%, by weight, and typically not more than about 98%, by weight, adsorbent. In some instances, the shaped adsorbent article includes 85 to 95%, preferably, approximately 90%, by weight, adsorbent. The shaped adsorbent article typically includes not less than about 2%, by weight, binder and not more than about 30%, by weight, binder. Further information regarding mold release, other additives, and molding techniques are discussed in U.S. Pat. No. 5,876,487, the entire disclosure of which is incorporated herein by reference.

Another embodiment of a suitable adsorbent includes a carrier. For example, a mesh or scrim may be used to hold the adsorbent material and binder. Polyester and other suitable materials may be used as the mesh or scrim. Typically, any carrier is not more than about 50% of the weight of the total article, and is more often about 20 to 40% of the total article weight. The reminder of the shaped adsorbent article is the same or similar to that without the carrier. The amount of binder in the shaped adsorbent article with the carrier typically ranges about 10 to 50% of the total article weight and the amount of adsorbent material typically ranges about 20 to 60% of the total article weight.

The adsorbent 25 may have a shape that is the same as the overall shape of adsorbent pouch assembly 20, such as shown in FIG. 2 where both assembly 20 and adsorbent 25 are rectangular. Alternately, adsorbent 25 may have a shape different than that of adsorbent pouch assembly 20.

Additional Configurations

FIG. 9 shows a cross-sectional view of a second embodiment of an adsorbent pouch assembly 20' that has non-adhesive base layer 32, adhesive layer 31, non-adhesive filtering layer 35, and adsorbent 25. Adhesive layer 31 of adsorbent pouch assembly 20' is a single layer of adhesive disposed on base layer 32 opposite outer surface 40. Adhesive layer 31 has an inner surface 30 on which adsorbent 25 is disposed. Perimeter seal 23 is formed by filtering layer 35 and inner surface 30 of adhesive layer 31.

Figure 10:
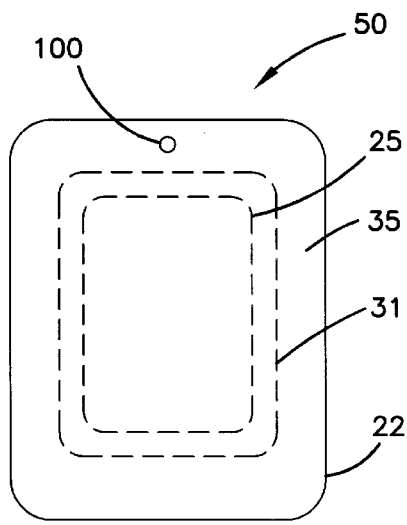
FIG. 10 is a cross-sectional view of a third embodiment of an adsorbent pouch assembly in accordance with the present invention.
Figure 12:
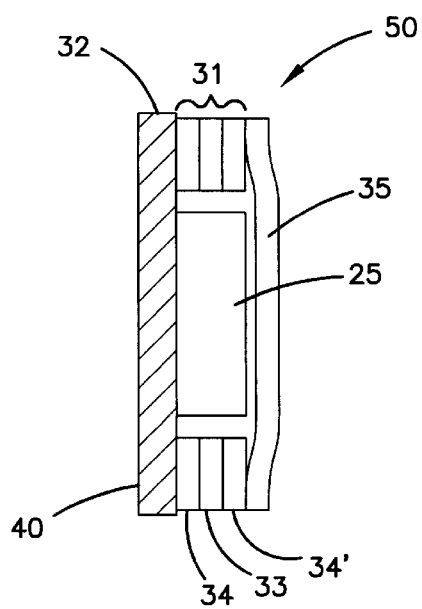
FIG. 12 is a cross-sectional view of a fourth embodiment of the adsorbent pouch assembly according to the present invention.

Referring now to FIGS. 10, 11 and 12, yet other embodiments of an adsorbent pouch assembly 50 are shown. Similar to adsorbent pouch assembly 20 of FIGS. 2 and 3, adsorbent pouch assembly 50 of FIGS. 10, 11 and 12 has adsorbent 25 disposed between non-adhesive filtering layer 35 and non-adhesive base layer 32. In FIG. 10, disposed on base layer 32 is adhesive layer 31, which includes two adhesive layers 34, 34' on opposing sides of carrier film 33. Adhesive layer 31 does not extend over the entire surface of base layer 32 as it did in the embodiment shown in FIG. 3; rather, adhesive layer 31 of FIG. 10 extends only around the perimeter 22 of adsorbent pouch assembly 50, as shown in the top view of adsorbent pouch assembly 50 in FIG. 11. In this embodiment of FIGS. 10 and 11, adhesive layer 31 is used to provide attachment of base layer 32 to filtering layer 35. A portion of adhesive layer 31 may extend to be present between adsorbent 25 and base layer 32 to help adhere adsorbent 25 to base layer 32, which may facilitate manufacture of the adsorbent pouch assembly. In some instances adsorbent 25 is not adhered to base layer 32 by adhesive layer 31 because little or no adhesive is present between adsorbent 25 and base layer 32; rather, adsorbent 25 is enclosed by base layer 32 and filtering layer 35 without being adhered to either base layer 32 or filtering layer 35.

FIG. 12 shows a cross-sectional view of adsorbent pouch assembly 50' that has base layer 32 and adhesive layer 31 only near perimeter 22 (as shown in phantom in top view in FIG. 11). Adhesive layer 31 of adsorbent pouch assembly 50' is a single layer of adhesive with no carrier film.

Method of Manufacturing an Adsorbent Pouch Assembly

One example method for manufacturing the adsorbent pouch assemblies 20, 20', 50, 50' is with a rotary press by methods that are well known. An advantage of the adsorbent pouch assemblies of the present invention is the non-adhesive outer surface 40 of the base layer 32. Because base layer 32 is non-adhesive, no liner is needed when packaging the assembly.

To manufacture adsorbent pouch assembly 20, a web of base layer 32 material is provided. Onto this base layer web is disposed an adhesive layer 31. Adhesive layer 31 may be provided as a web of double-sided PSA tape or may be a single layer of liquid adhesive applied via, for example, knife blade, roll coating, or other coating method. Adsorbent 25 is positioned on adhesive layer 31 with sufficient spacing between adjacent adsorbent material so that a complete perimeter seal 23 may be later made. A web of filtering layer 35 material is placed over adsorbent 25.

Once all layers have been assembled, perimeter seal 23 may be formed simultaneously when individual adsorbent pouch assemblies 20 are cut. For example, a die that both provides pressure to create perimeter seal 23 and is sufficiently sharp to cut perimeter 22 may be used. Alternately, filtering layer 35 may be pressed against adhesive layer 31 disposed on base layer 32 in order to form perimeter seal 23 before individual adsorbent pouch assemblies 20 are cut.

In some embodiments, it may be preferred that instead of cutting individual separate assemblies 20, the web of assemblies is scored or serrated, so that the adsorbent pouch assemblies 20 can be later individually separated. The non-adhesive outer surface 40 of base layer 32 allows the assembly web to be neatly rolled and packaged without the need for a liner to cover up any adhesive.

To manufacture adsorbent pouch assembly 50, the steps are similar to those described above, except that adhesive layer 31 is applied in pattern. A pattern can be obtained in a coating of adhesive by using well known pattern coating techniques, such as embossed roll coating. Alternately, a double sided tape that has been cut with the desired pattern can be used.

Examples of Adsorbent Pouch Assemblies

The size, shape, and configuration, of base layer 32, adhesive layer 31, adsorbent 25, filtering layer 35, and overall adsorbent pouch assembly 20, 50 depends on the intended use of adsorbent pouch assembly 20, 50. In some embodiments, it may be desired that adsorbent pouch assembly 20, 50 is streamlined to prevent or minimize air flow disturbance or air flow resistance, for example, within disk drive assembly 10.

As one example, an adsorbent pouch assembly 20 for use in a computer disk drive assembly may have outer dimensions of about 5 to 20 mm by 10 to 20 mm when measured at perimeter 22, and an overall thickness of about 1 to 4 mm. Adsorbent pouch assembly may be rectangular in shape.

Base layer 32 may be a non-adhesive layer, for example, polyester such as Mylar® film, having a thickness greater than about 25 micrometers (1 mil). Preferably, the thickness is less than about 150 micrometers (6 mils). In some embodiments, the thickness of base layer 32 ranges from about 50 to 100 micrometers (2 to 4 mils).

Overall, adhesive layer 31, whether a single layer of adhesive or two layers of adhesive on a carrier, has a thickness greater than about 12 micrometers (0.5 mil). Preferably, the thickness is less than about 125 micrometers (5 mils). In some embodiments, the thickness of adhesive layer 31 ranges from about 25 to 100 micrometers (1 to 4 mils), and in yet further embodiments, the thickness of adhesive layer 31 ranges from about 50 to 75 micrometers (2 to 3 mils), although thicker and thinner layers 31 may be used.

Adhesive layer 31 may be a double sided tape, such as a tape made by coating adhesive, such as that commercially available from 3M under the trade designation 9462P, onto Mylar® film. Each adhesive layer 34, 34' has a thickness of about 50 micrometers (2 mils) and the carrier film 33 has a thickness of about 25 to 50 micrometers (1 to 2 mils).

Adsorbent 25 may be free-flowing particulate or may be shaped. Adsorbent 25 may occupy an area between about 0.5 $cm^2$ and 3 $cm^2$ when viewed from the top as in FIG. 2, although this area will vary, depending on the size of adsorbent pouch assembly 20 and the application in which adsorbent pouch assembly 20 is used. The area occupied by adsorbent 25 can be shaped the same as or be shaped different than the shape of adsorbent pouch assembly 20. A thin adsorbent 25, for example, with a thickness of about 0.3 to 1.5 mm (about 15 to 60 mils), may be desired in applications where it is desired to streamline adsorbent pouch assembly 20. In some embodiments, adsorbent 25 may be about 2 to 4 mm (80 to 160 mils) in thickness.

Over adsorbent 25 is filtering layer 35, through which air may permeate to allow any contaminants in the air to be adsorbed by adsorbent 25. Filtering layer 35 may be a porous PTFE material, having a thickness greater than about 25 micrometers (1 mil). Additionally, filtering layer 35 may have a thickness less than about 0.5 mm (20 mils). Generally, the thickness of filtering layer 35 ranges from about 50 to 305 micrometers (2 to 12 mils), and typically, the thickness of filtering layer 35 ranges from about 125 to 260 micrometers (5 to 10 mils), although thicker and thinner layers 35 may be used.

The air permeability of filtering layer 35 may be at least about 0.03 cm/sec (0.05 ft/min) at a pressure drop of about 0.1 cm (0.05 inches) of water.

It should be noted that the thickness, ranges, etc. disclosed in this example are not in any way limiting but are provided as a guide.

The above specification, examples and data provide a complete description of the manufacture and use of the composition of the invention. Since many embodiments of the invention can be made without departing from the spirit and scope of the invention, the invention resides in the claims hereinafter appended.

We claim:

1. An adsorbent pouch assembly for removing gaseous contaminants from a disk drive, the pouch assembly comprising:
    (a) a non-adhesive, nonporous base layer having a non-adhesive outer surface;
    (b) an adhesive layer disposed on the base layer opposite the outer surface;
    (c) a non-adhesive filtering layer disposed over the non-adhesive base layer and the adhesive layer; and
    (d) an adsorbent material disposed between the non-adhesive base layer and the non-adhesive filtering layer, the filtering layer and adhesive layer forming a peripheral seal around the adsorbent material;
    wherein the adsorbent pouch assembly is configured and arranged for non-adhesively mounting in the disk drive.

2. The adsorbent pouch assembly of claim 1, wherein the adhesive layer comprises a carrier film having a first side and a second side opposite to the first side, with a layer of adhesive on each of the first side and the second side.

3. The adsorbent pouch assembly of claim 1, wherein the adhesive layer is a double-sided pressure sensitive adhesive tape.

4. The adsorbent pouch assembly of claim 1, wherein the filtering layer comprises polytetrafluoroethylene.

5. The adsorbent pouch assembly of claim 1, wherein the filtering layer comprises expanded porous polytetrafluoroethylene.

6. The adsorbent pouch assembly of claim 1, wherein the adsorbent comprises a material selected from the group consisting of activated carbon; activated alumina; molecular sieves; silica gel; a material impregnated with at least one material selected from the group consisting of potassium permanganate, calcium carbonate, potassium carbonate, sodium carbonate and calcium sulfate; and combinations thereof.

7. The adsorbent pouch assembly of claim 1, wherein the adsorbent comprises an adsorbent material and a carrier.

8. The adsorbent pouch assembly of claim 1, wherein the base layer comprises polytetrafluoroethylene.

9. The adsorbent pouch assembly of claim 1, wherein the filter layer, adhesive layer, and base layer define an opening adapted for passing a mounting member therethrough.

10. The adsorbent pouch assembly of claim 1, wherein the adsorbent pouch assembly is configured and arranged for non-adhesively mounting in the disk drive with the outer surface of the non-adhesive base layer adjacent a surface of the disk drive.

11. The adsorbent pouch assembly of claim 1, wherein the adhesive layer is disposed on only a perimeter of the base layer.

12. A combination of a disk drive and an adsorbent pouch assembly, the combination comprising:
 (a) a device housing including therein a disk drive to be protected; and
 (b) an adsorbent pouch assembly for protecting the disk drive, wherein the adsorbent pouch assembly is non-adhesively mounted on an interior wall surface of the housing, the adsorbent pouch assembly comprising:
  (i) a non-adhesive, nonporous base layer having a non-adhesive outer surface;
  (ii) an adhesive layer disposed on the base layer opposite the outer surface;
  (iii) a non-adhesive filtering layer disposed over the non-adhesive base layer and the adhesive layer and forming, with the adhesive layer, a peripheral seal; and
  (iv) an adsorbent material disposed between the non-adhesive base layer and the non-adhesive filtering layer within the peripheral seal.

13. The combination of claim 12, wherein the adsorbent pouch assembly is non-adhesively mounted on a bottom wall of the housing.

14. The combination of claim 12, wherein the adsorbent pouch assembly is mounted on an interior wall surface of the housing by a mounting member.

15. The combination of claim 12, wherein the filtering layer comprises polytetrafluoroethylene.

16. The combination of claim 12, wherein the base layer comprises polytetrafluoroethylene.

17. The combination of claim 16, wherein the adsorbent pouch assembly is mounted on an interior wall surface of the housing with the base layer positioned non-horizontal with respect to the interior wall surface.

18. The combination of claim 17, wherein the base layer is positioned generally perpendicular to the interior wall.

19. The combination of claim 12, wherein the base layer is mounted directly on a surface of the device housing.

20. An adsorbent pouch assembly for removing gaseous contaminants from a disk drive, the pouch assembly comprising:
 (a) a nonporous base layer having a non-adhesive first surface and a second surface opposing the first surface, wherein the non-adhesive first surface forms a non-adhesive external surface of the adsorbent pouch assembly;
 (b) an adhesive layer disposed on the second surface of the base layer;
 (c) a non-adhesive filter layer disposed over the base layer and together with the base layer and the adhesive layer forming a peripheral seal; and
 (d) an adsorbent disposed between the second surface of the base layer and the non-adhesive filter layer, the peripheral seal being around the adsorbent.

21. The adsorbent pouch assembly of claim 20 wherein the adhesive layer is a double-sided pressure sensitive adhesive tape.

* * * * *

UNITED STATES PATENT AND TRADEMARK OFFICE
CERTIFICATE OF CORRECTION

PATENT NO. : 6,214,095 B1
DATED : April 10, 2001
INVENTOR(S) : Logan et al.

Page 1 of 1

It is certified that error appears in the above-identified patent and that said Letters Patent is hereby corrected as shown below:

Column 5,
Line 2, "11" should read -- 111 --
Line 5, "10" should read -- 110 --
Line 29, "10" should read -- 110 --

Column 9,
Line 16, "chernisorbents" should read -- chemisorbents --

Signed and Sealed this

Seventh Day of May, 2002

Attest:

JAMES E. ROGAN
Attesting Officer    *Director of the United States Patent and Trademark Office*